United States Patent
Long

(10) Patent No.: US 11,375,859 B1
(45) Date of Patent: Jul. 5, 2022

(54) SHOWER TENT ASSEMBLY

(71) Applicant: Lonman Auto Accessories Co., Ltd, Dongguan (CN)

(72) Inventor: Shihu Long, Dongguan (CN)

(*) Notice: Subject to any disclaimer, the term of this patent is extended or adjusted under 35 U.S.C. 154(b) by 0 days.

(21) Appl. No.: 17/331,670

(22) Filed: May 27, 2021

(30) Foreign Application Priority Data

Apr. 14, 2021 (CN) .................. 202120757396.X

(51) Int. Cl.
*A47K 3/32* (2006.01)
*A47K 3/38* (2006.01)
*B60R 15/02* (2006.01)

(52) U.S. Cl.
CPC ............... *A47K 3/325* (2013.01); *A47K 3/38* (2013.01); *B60R 15/02* (2013.01)

(58) Field of Classification Search
CPC . A47K 3/325; A47K 3/32; A47K 3/36; A47K 3/38
USPC ............................................................. 4/599
See application file for complete search history.

(56) References Cited

U.S. PATENT DOCUMENTS

| | | | | |
|---|---|---|---|---|
| 2,829,661 A | * | 4/1958 | Crot | E04H 15/06 135/88.13 |
| 3,743,345 A | * | 7/1973 | Eckman | B60P 3/341 296/26.05 |
| 4,457,553 A | * | 7/1984 | Larkin | B60P 3/34 296/160 |
| 7,464,983 B1 | * | 12/2008 | Acosta | E04H 15/06 296/159 |
| 8,225,436 B1 | * | 7/2012 | Cotton | B60R 9/048 4/597 |
| 9,944,233 B2 | * | 4/2018 | Karuppaswamy | B60R 9/045 |

* cited by examiner

*Primary Examiner* — Huyen D Le

(57) ABSTRACT

A shower tent assembly is provided. The shower tent assembly includes a fixed plate fixed to an automobile and a tent fabric, wherein supporting arms are rotatably connected to two sides of the fixed plate separately and a middle connector is connected between outer end portions of the supporting arms; the supporting arms, the fixed plate and the middle connector each are connected to upper connecting bands, an upper end of the tent fabric is connected to lower connecting bands corresponding to the upper connecting bands, length adjusting units are arranged between the upper connecting bands and the lower connecting bands, and the upper connecting bands and the lower connecting bands are connected to the length adjusting units. By arranging the length adjusting units, a height of the tent fabric is adjusted, so that the height of the tent fabric is convenient to use the shower tent assembly.

10 Claims, 7 Drawing Sheets

SHOWER TENT ASSEMBLY

CROSS REFERENCE TO THE RELATED APPLICATIONS

This application is based upon and claims priority to Chinese Patent Application No. 202120757396.X filed on Apr. 14, 2021, the entire contents of which are incorporated herein by reference.

TECHNICAL FIELD

The invention relates to the technical field of automobile accessories, in particular to a shower tent assembly.

BACKGROUND

With improvement of living standard of people, people often go for a trip by car more and more frequently and like to camp in the field. However, it is needed to solve daily trivial matters such as shower in long-term camping. Current cross country vehicles are not provided with shower facilities usually, so that the outdoor life time is affected. In order to solve the problem, the applicant invents an invention: a shower tent capable of being combined with an automobile, the patent number being CN2018212223216 and the name being the shower tent. The shower tent is fixed to an automobile body by a fixed plate, and a shrinking supporting arm on the fixed plate hangs up the tent fabric to form the simple shower tent. In a using process, it is found that the height of the fabric tent cannot be adjusted, which cannot meet the demands of most users, and there are shortcomings in use.

SUMMARY

Aiming to overcome defects in the prior art, the invention provides a shower tent assembly. The height of the shower tent assembly can be adjusted, so that it is convenient to use the shower tent assembly.

In order to achieve the purpose, the invention provides a technical scheme as follows:

A shower tent assembly, including:

a fixed plate fixed to an automobile, wherein supporting arms are rotatably connected to two sides of the fixed plate separately and a middle connector is connected between outer end portions of the two supporting arms;

a tent fabric;

the supporting arms, the fixed plate and the middle connector each are connected to a plurality of upper connecting bands, the upper end of the tent fabric is connected to a plurality of lower connecting bands corresponding to the upper connecting bands, length adjusting units are arranged between the upper connecting bands and the lower connecting bands, and the upper connecting bands and the lower connecting bands are connected to the length adjusting units.

Further, each length adjusting unit includes a stair button or a snap fastener or a magic tape.

Further, each length adjusting unit includes a button hole and a button.

Further, fixed seats are separately connected to two sides of the fixed plate, a side plate is arranged on at least one of upper and lower sides of the fixed seats, the side plate is connected to a pivoting shaft, a connecting cylinder is connected outside the pivoting shaft in a sleeving manner, a connecting rod is arranged on a side surface of the connecting cylinder, the connecting rods on two sides are arranged in a staggered manner, and each supporting arm is provided with a splicing slot matched with each connecting rod.

Further, a foldable supporting part is arranged between each supporting arm and the fixed plate and includes an inner connecting piece and an outer connecting piece hinged to each other, the fixed plate is connected to the inner fixed seat, one end of the inner connecting piece is hinged to the inner fixed seat, a side surface of the supporting arm is connected to the outer fixed seat, and one end of the outer connecting piece is hinged to the outer fixed seat; the inner connecting piece or the outer connecting piece is provided with a limiting block for limiting a rotating angle of the outer connecting piece relative to the inner connecting piece; when the supporting arm is rotated to be parallel to the fixed plate, the foldable supporting piece is in a folded state and when the supporting arm is rotated to be vertical to the fixed plate, the foldable supporting piece is in an unfolded state.

Further, a middle portion of a lower end surface of each supporting arm is concave inward to form a slot, an insertion rod is arranged in the slot, and the upper connecting bands are connected to the insertion rod.

Further, the middle connector includes a middle connecting band and a middle connecting rod.

Further, an end portion of the supporting arm is connected to an end cover.

Further, the shower tent assembly further includes a hood body, wherein when the supporting arm is unfolded, the hood body is connected to the outer sides of the fixed plate and the supporting arm in a sleeving manner.

Further, the shower tent assembly further includes a flexible sleeve shell, wherein the front end of the sleeve shell is opened and is connected to a shielding cover, and the fixed plate is located in the sleeve shell and is fixedly connected to the sleeve shell.

Further, the lower end of the tent fabric is detachably connected to a positioning part for fixing the tent fabric in an auxiliary manner.

Further, the fixed plate is connected to a bundling strap for bundling the supporting arm.

The invention has the beneficial effects that by arranging the length adjusting units, the height of the tent fabric can be adjusted, so that it is convenient to use the shower tent assembly.

Figure 1:
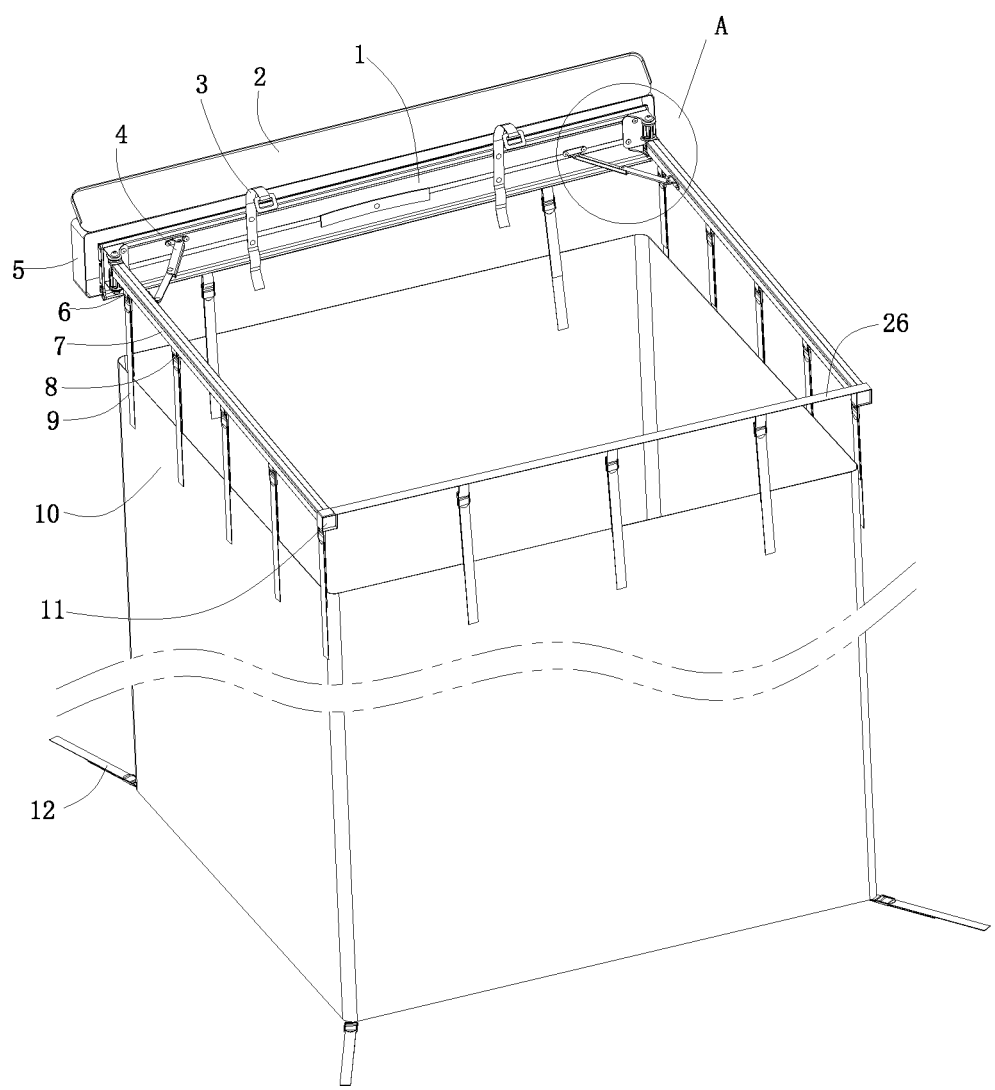
FIG. 1 is a structural schematic diagram of the invention.
Figure 2:
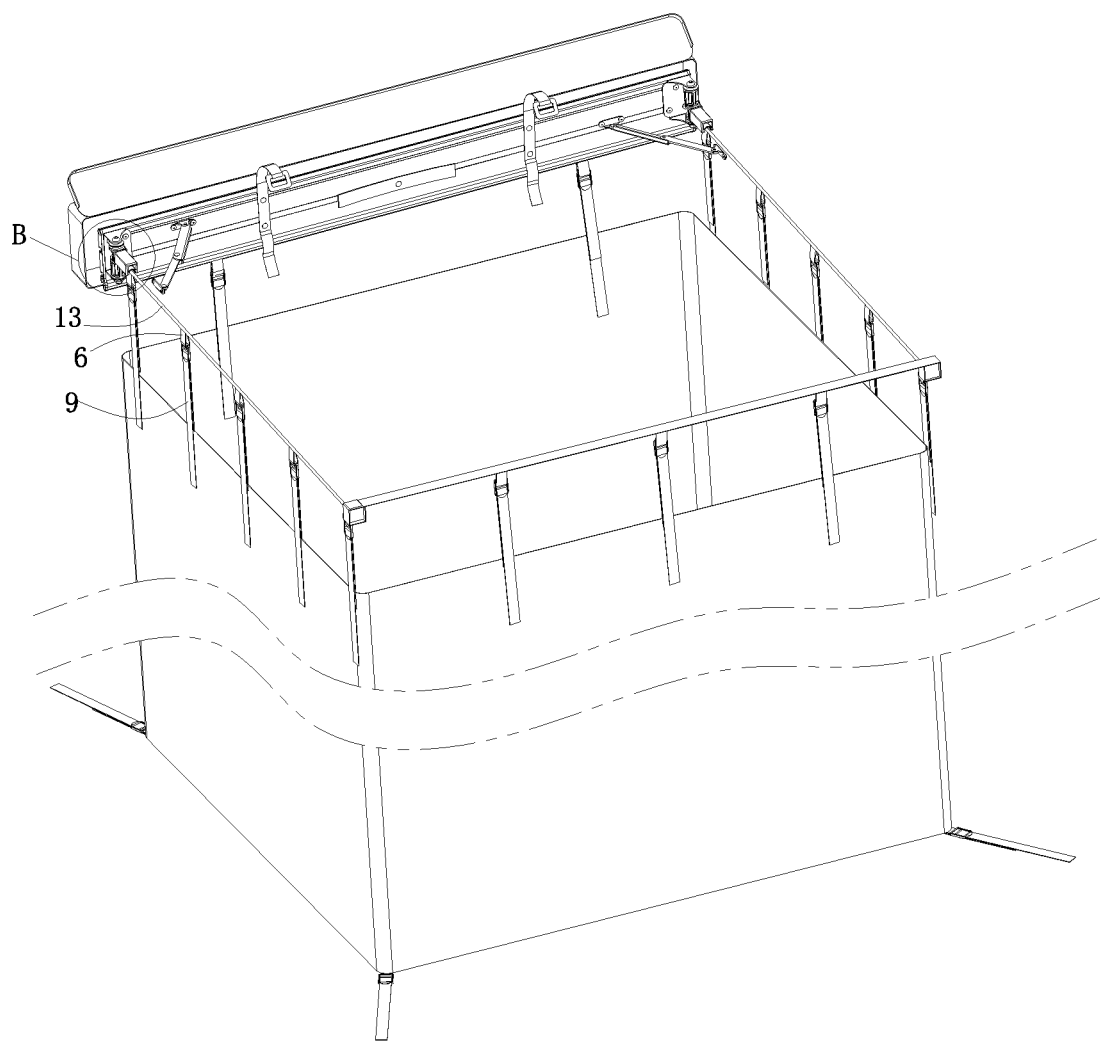
FIG. 2 is a schematic diagram of the FIG. 1 without a rotating arm.
Figure 3:
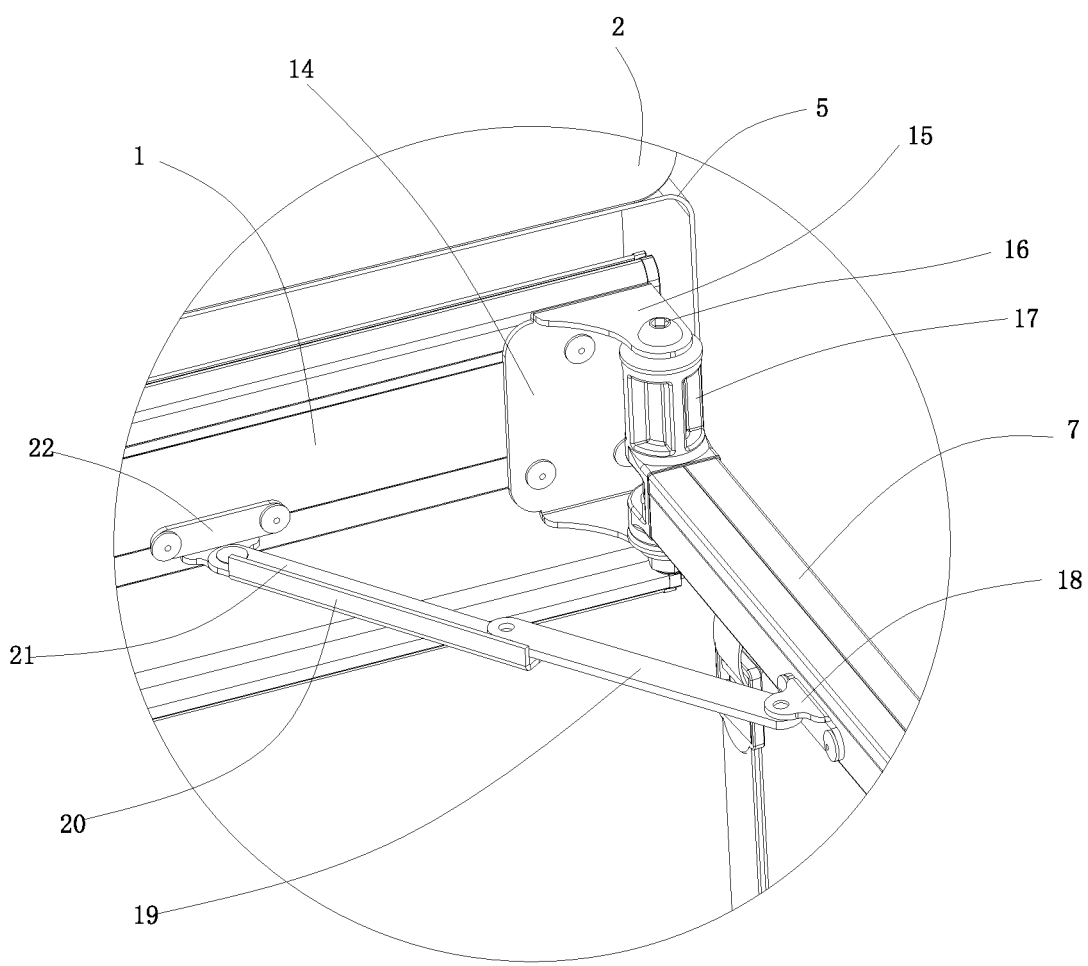
FIG. 3 is an enlarged schematic diagram of A in the FIG. 1.

In the drawings, 1—fixed plate; 2—shielding cover; 3—bundling strap; 4—foldable supporting piece; 5—sleeve shell; 6—upper connecting band; 7—supporting arm; 8—length adjusting unit; 9—lower connecting band; 10—tent fabric; 11—end cover; 12—positioning piece; 13—insertion rod; 14—fixed seat; 15—side plate; 16—pivoting shaft; 17—connecting cylinder; 18—outer fixed seat; 19—outer connecting piece; 20—limiting block; 21—inner connecting piece; 22—inner fixed seat; 23—insertion slot; 24—slot; 25—hood body; 26—middle connector; 27—connecting rod.

DETAILED DESCRIPTION OF THE EMBODIMENTS

Clear and intact description will be made on technical scheme in the embodiment of the invention below in combination with drawings in the embodiment of the invention. The described embodiments are merely a part of embodiments of the invention and are not all the embodiments. On a basis of the embodiments in the invention, all other embodiments obtained by those skilled in the technical field without creative efforts fall into the scope of protection of the invention.

Example A shower tent assembly includes a fixed plate 1 fixed to an automobile, wherein supporting arms 7 are rotatably connected to two sides of the fixed plate 1 separately and a middle connector 26 is connected between outer end portions of the two supporting arms 7; and a tent fabric 10;

the supporting arms 7, the fixed plate 1 and the middle connector 26 each are connected to a plurality of upper connecting bands 6, the upper end of the tent fabric 10 is connected to a plurality of lower connecting bands 9 corresponding to the upper connecting bands 6, length adjusting units 8 are arranged between the upper connecting bands 6 and the lower connecting bands 9, and the upper connecting bands 6 and the lower connecting bands 9 are connected to the length adjusting units 8.

The technical scheme can be improved based on an original technology. The original connecting piece with fixed length is decomposed into two portions: the upper connecting bands 6 and the lower connecting bands 9 are connected by the length adjusting units 8. During connection, the connection positions of the upper connecting bands 6 and/or the lower connecting bands 9 can be adjusted, so that a purpose of adjusting the height of the tent fabric 10 is achieved. The upper connecting bands 6 can be fixed to the supporting arms 7 by way of banding or bonding and the lower connecting bands 9 can be further fixed to the tent fabric 10 by way of banding or bonding.

Further, each length adjusting unit 8 includes a stair button.

During use, one of the upper connecting band 6 and the lower connecting band 9 is connected to one end of the stair button while the other one of the upper connecting band 6 and the lower connecting band 9 winds the stair button, so that the length can be adjusted and it is convenient to use.

Further, each length adjusting unit 8 includes a snap fastener or a magic tape.

When the length adjusting unit 8 is the snap fastener, one of the upper connecting band 6 and the lower connecting band 9 is connected to a plurality of son buttons or mother buttons while the other one of the upper connecting band 6 and the lower connecting band 9 is correspondingly connected to at least one mother button or son button. The son buttons and mother buttons in different positions are buckled to achieve an adjusting purpose. When the length adjusting unit 8 is the magic tape, two portions of the magic tape are fixed to the upper connecting band 6 and the lower connecting band 9 separately, and during connection, the connecting position can be adjusted.

Further, each length adjusting unit 8 includes a button hole and a button.

When the button hole and the button are adopted, one of the upper connecting band 6 and the lower connecting band 9 is provided with a plurality of button holes while the other is provided with the button. The buttons are buckled to different button holes to achieve the adjusting purpose.

Figure 4:
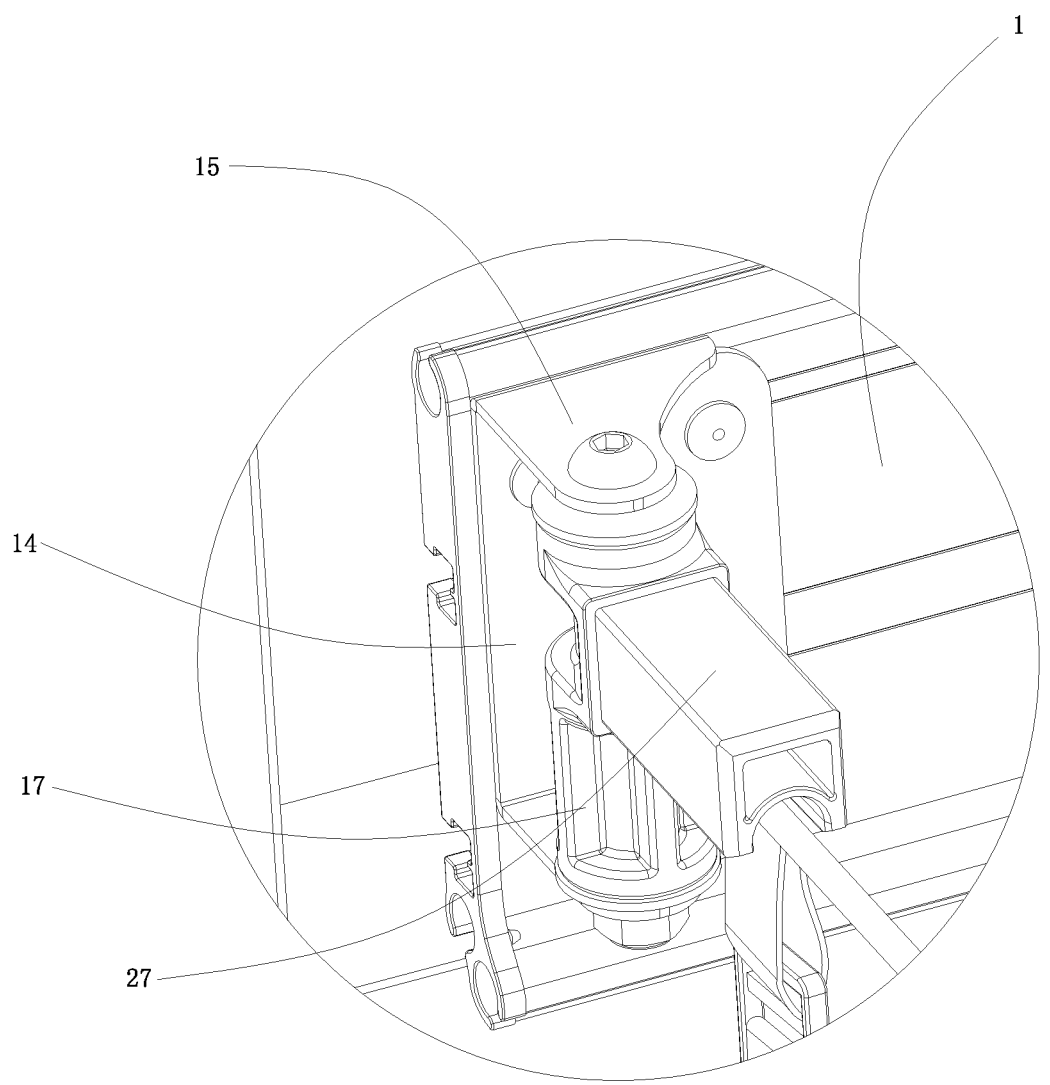
FIG. 4 is an enlarged schematic diagram of B in the FIG. 2.

With reference to the FIG. 4 and FIG. 4, further, fixed seats 14 are separately connected to two sides of the fixed plate 1, a side plate 15 is arranged on at least one of upper and lower sides of the fixed seats 14, the side plate 15 is connected to a pivoting shaft 16, a connecting cylinder 17 is connected outside the pivoting shaft 16 in a sleeving manner, a connecting rod 27 is arranged on a side surface of the connecting cylinder 17, the connecting rods 27 on two sides are arranged in a staggered manner, and each supporting arm 7 is provided with a splicing slot 23 matched with each connecting rod 23.

By arranging the pivoting shaft 16 on the fixed seats 14 on two sides, the connecting cylinder 17 can rotate relative to the fixed plate 1. The supporting arm 7 spliced to the connecting rod 27 is indirectly connected to the connecting column, and the supporting arm 7 further can rotate relative to the fixed plate 1. Sure, the supporting arms 7 and the connecting rods 27 can be integrally formed. According to the connecting mode of the supporting arms 7 and the connecting rods 27, it is convenient to operate. Second, the position can be further adjusted. The connecting rods 27 are arranged in a staggered manner, so that the supporting arms 7 rotatably recovered can be arranged in parallel in a staggered manner.

Further, a foldable supporting part is arranged between each supporting arm 7 and the fixed plate 1 and includes an inner connecting piece 21 and an outer connecting piece 19 hinged to each other, the fixed plate 1 is connected to the inner fixed seat 22, one end of the inner connecting piece 21 is hinged to the inner fixed seat 22, a side surface of the supporting arm 7 is connected to the outer fixed seat 18, and one end of the outer connecting piece 19 is hinged to the outer fixed seat 18; the inner connecting piece 21 or the outer connecting piece 19 is provided with a limiting block 20 for limiting a rotating angle of the outer connecting piece 19 relative to the inner connecting piece 21; when the supporting arm 7 is rotated to be parallel to the fixed plate 1, the foldable supporting piece 4 is in a folded state and when the supporting arm 7 is rotated to be vertical to the fixed plate 1, the foldable supporting piece 4 is in an unfolded state.

The foldable supporting piece 4 is formed by hinging the inner connecting piece 21 and the outer connecting piece 19. In specific arrangement, the foldable supporting piece 4 is arranged on one side of the supporting arm 7, the supporting arm 7 is rotated from a state being parallel to the fixed plate 1 to a state being vertical to the fixed plate 1, the rotating angle of the outer connecting piece 19 relative to the inner connecting piece 21 is ranged from 0 degree to 180 degrees and is then limited by the limiting block. After arranging the limiting block, the supporting arm 7 can be prevented from rotating under external force drive and is kept to be vertical to the fixed plate 1.

Figure 5:
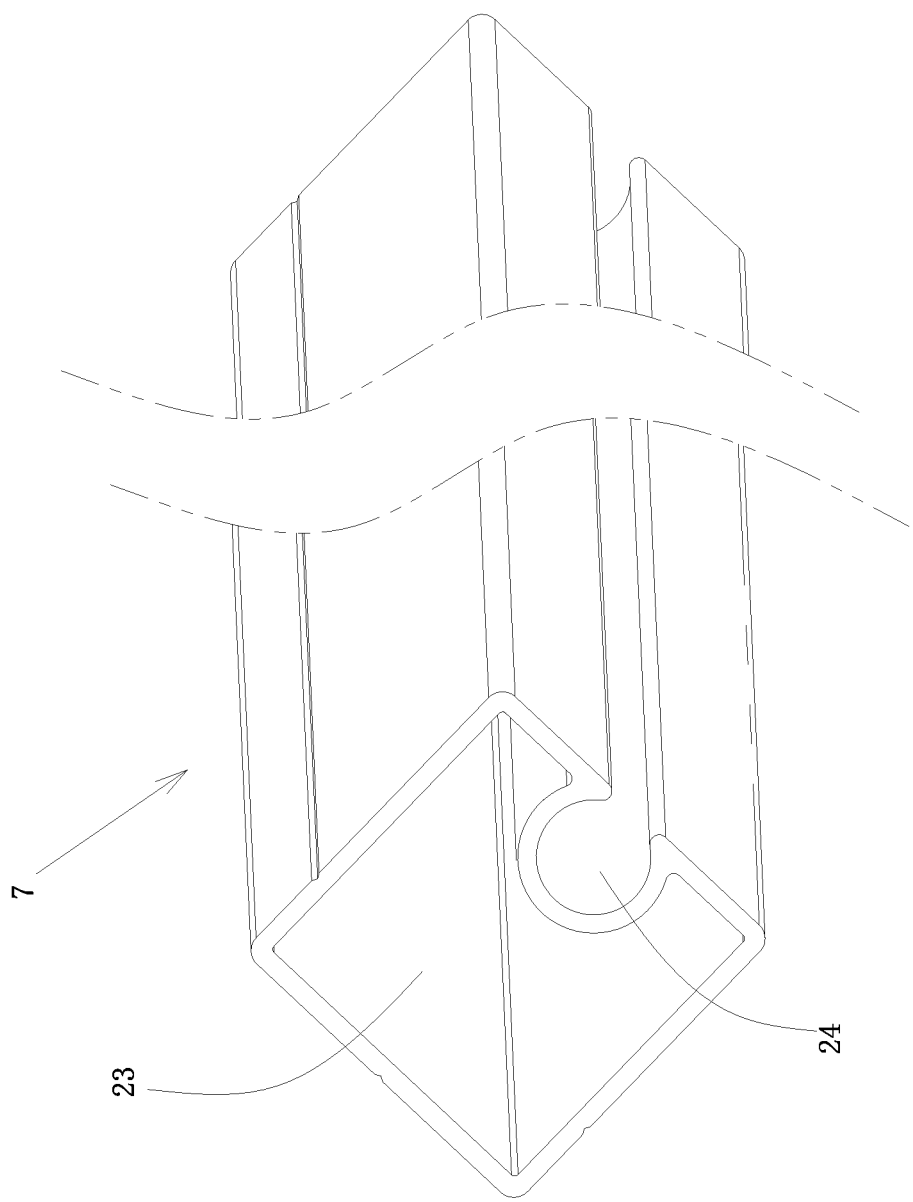
FIG. 5 is a structural schematic diagram of the rotating arm.
Figure 6:
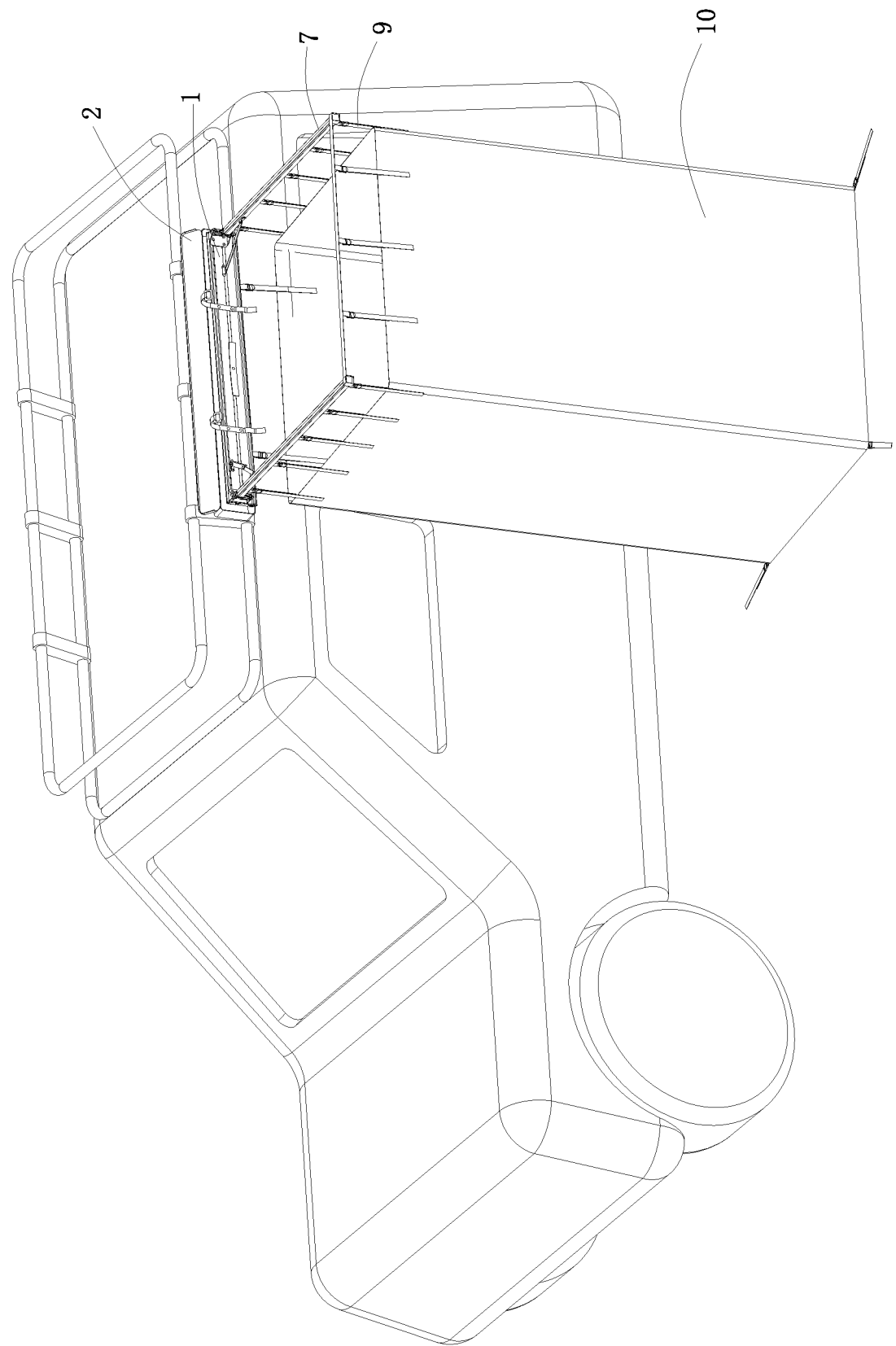
FIG. 6 is a structural schematic diagram of application of the embodiment.

With reference to the FIG. 5, further, a middle portion of a lower end surface of each supporting arm 7 is concave inward to form a slot 24, an insertion rod 13 is arranged in the slot 24, and the upper connecting bands 6 are connected to the insertion rod 13.

The slot 24 and the insertion rod 13 are arranged on the supporting arm, so that the integral structure is split conveniently. Meanwhile, connection of the upper connecting band 6 is located in the slot 24 for the convenience of protection.

Further, the middle connector 26 includes a middle connecting band and a middle connecting rod 27.

In specific use, the middle connector 26 is usually a middle connecting band or a cotton rope which is convenient to adjust length and has a certain degree of elasticity. The middle connector can be the middle connecting rod 27, too, which is connected to the supporting arm 7 by way of splicing, clamping, bolt connection and the like.

Further, an end portion of the supporting arm 7 is connected to an end cover 11.

By arranging the end cover 11, the insertion rod 13 is hidden favorably.

Figure 7:
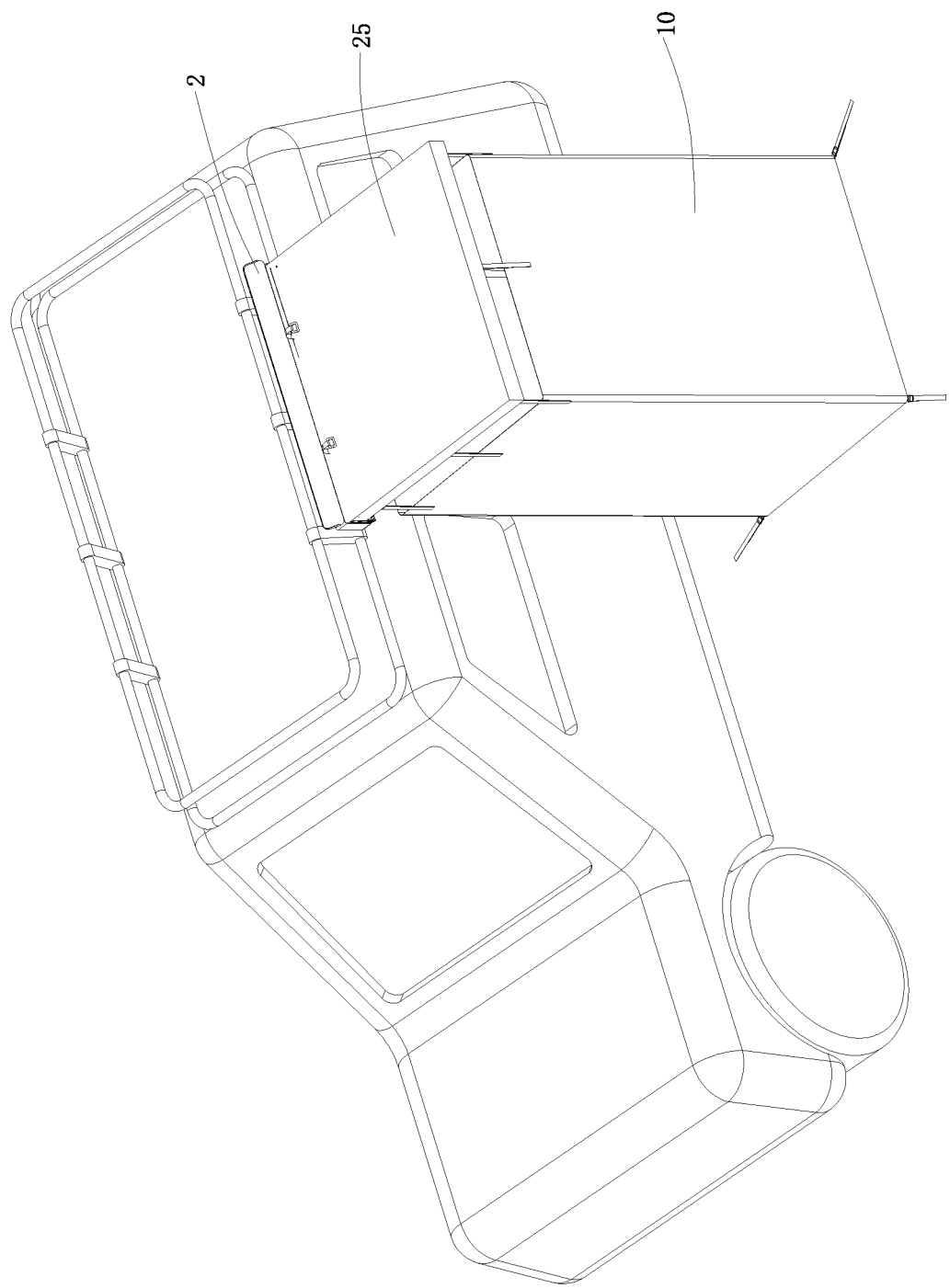
FIG. 7 is another structural schematic diagram of application of the embodiment.

With reference to the FIG. 7, further, the shower tent assembly further includes a hood body 25, wherein when the supporting arm 7 is unfolded, the hood body 25 is connected to the outer sides of the fixed plate 1 and the supporting arm 7 in a sleeving manner.

By arranging the hood body 25, other people can be prevented from peeping above, so that privacy is protected favorably.

Further, the shower tent assembly further includes a flexible sleeve shell 5, wherein the front end of the sleeve shell 5 is opened and is connected to a shielding cover 2, and the fixed plate 1 is located in the sleeve shell and is fixedly connected to the sleeve shell 5.

The sleeve shell 5 can be made from materials such as leather or cloth. The fixed plate 1 can be protected by additional arrangement. When not used, the fixed plate 1, the supporting arm 7 and the like can be wrapped in the sleeve shell 5.

Further, the lower end of the tent fabric 10 is detachably connected to a positioning part 12 for fixing the tent fabric 10 in an auxiliary manner.

The positioning part 12 can be a pull rope, a contact pin and the like, and can prevent the tent fabric 10 from fluctuating along with wind when wind springs up.

Further, the fixed plate 1 is connected to a bundling strap 3 for bundling the supporting arm 7.

When being folded and the supporting arm 7 is rotated to be parallel to the fixed plate 1, the supporting arm 7 and the fixed plate 1 can be bundled together by means of the bandage. The supporting arm 7 is prevented from rotating randomly.

For those skilled in the art, it is apparently that the invention is not limited to details of the above exemplary embodiments. The invention can be realized in other specific forms without departing the spring or essential characteristics of the invention. Therefore, from every point, the embodiment shall be regarded as the exemplary embodiment rather than non—restrictive embodiment. The scope of the invention is defined by attached claims rather than the above description. Therefore, all changes falling into content and scope of equivalent elements of the claims shall be included in the invention. Any drawing marks in the claims shall not be regarded to limit the referred claims.

What is claimed is:

1. A shower tent assembly, comprising:
a fixed plate fixed to an automobile, wherein supporting arms are rotatably connected to two sides of the fixed plate separately and a middle connector is connected between outer end portions of the supporting arms; and
a tent fabric;
wherein the supporting arms, the fixed plate and the middle connector each are connected to a plurality of upper connecting bands, an upper end of the tent fabric is connected to a plurality of lower connecting bands corresponding to the plurality of upper connecting bands, length adjusting units are arranged between the plurality of upper connecting bands and the plurality of lower connecting bands, and the plurality of upper connecting bands and the plurality of lower connecting bands are connected to the length adjusting units.

2. The shower tent assembly according to claim 1, wherein each length adjusting unit comprises a stair button or a snap fastener or a magic tape.

3. The shower tent assembly according to claim 1, wherein fixed seats are separately connected to the two sides of the fixed plate, a side plate is arranged on at least one of upper and lower sides of the fixed seats, the side plate is connected to a pivoting shaft, a connecting cylinder is connected outside the pivoting shaft in a sleeving manner, a connecting rod is arranged on a side surface of the connecting cylinder, the connecting rods on two sides are arranged in a staggered manner, and each supporting arm is provided with a splicing slot matched with each connecting rod.

4. The shower tent assembly according to claim 1, wherein a foldable supporting piece is arranged between each supporting arm and the fixed plate and comprises an inner connecting piece and an outer connecting piece hinged to each other, the fixed plate is connected to an inner fixed seat, one end of the inner connecting piece is hinged to the inner fixed seat, a side surface of the each supporting arm is connected to an outer fixed seat, and one end of the outer connecting piece is hinged to the outer fixed seat; the inner connecting piece or the outer connecting piece is provided with a limiting block for limiting a rotating angle of the outer connecting piece relative to the inner connecting piece; when the each supporting arm is rotated to be parallel to the fixed plate, a foldable supporting piece is in a folded state and when the each supporting arm is rotated to be vertical to the fixed plate, the foldable supporting piece is in an unfolded state.

5. The shower tent assembly according to claim 1, wherein a middle portion of a lower end surface of each supporting arm is concave inward to form a slot, an insertion rod is arranged in the slot, and the plurality of upper connecting bands are connected to the insertion rod.

6. The shower tent assembly according to claim 1, wherein an end portion of each supporting arm is connected to an end cover.

7. The shower tent assembly according to claim 1, further comprising a hood body, wherein when each supporting arm is unfolded, the hood body is connected to outer sides of the fixed plate and the each supporting arm in a sleeving manner.

8. The shower tent assembly according to claim 1, further comprising a flexible sleeve shell, wherein a front end of the flexible sleeve shell is opened and is connected to a shielding cover, and the fixed plate is located in the flexible sleeve shell and is fixedly connected to the flexible sleeve shell.

9. The shower tent assembly according to claim 1, wherein a lower end of the tent fabric is detachably connected to a positioning part for fixing the tent fabric in an auxiliary manner.

10. The shower tent assembly according to claim 1, wherein the fixed plate is connected to a bundling strap for bundling each supporting arm.

\* \* \* \* \*